United States Patent
Toyoda et al.

(10) Patent No.: US 6,914,982 B2
(45) Date of Patent: Jul. 5, 2005

(54) FOLDING PORTABLE CELLULAR PHONE

(75) Inventors: Ryuichi Toyoda, Yokohama (JP); Ko Kondo, Sendai (JP); Akitoshi Mori, Yokohama (JP); Teruo Nanmoku, Naka-gun (JP); Yuichiro Suganuma, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 09/921,774

(22) Filed: Aug. 3, 2001

(65) Prior Publication Data

US 2002/0042252 A1 Apr. 11, 2002

(30) Foreign Application Priority Data

Aug. 4, 2000 (JP) .................................. P. 2000-237309
Aug. 4, 2000 (JP) .................................. P.2000-237310

(51) Int. Cl.[7] .............................................. H04M 1/00
(52) U.S. Cl. ............... 379/433.13; 379/368; 455/575.1; 455/575.3; 455/90.1; 361/818
(58) Field of Search ........................ 379/433.01, 433.13, 379/368; 455/575.1, 575.3, 90.1; 361/818

(56) References Cited

U.S. PATENT DOCUMENTS

| | | | |
|---|---|---|---|
| 5,150,282 A | * | 9/1992 | Tomura et al. ............. 361/818 |
| 5,357,570 A | * | 10/1994 | Tomura et al. ......... 379/433.01 |
| 5,546,457 A | * | 8/1996 | Tomura et al. ............. 379/368 |
| 5,732,331 A | * | 3/1998 | Harms ...................... 455/575.3 |
| 5,832,080 A | * | 11/1998 | Beutler et al. ......... 379/433.13 |
| 5,905,796 A | * | 5/1999 | Jung ...................... 379/433.13 |
| 6,011,699 A |  | 1/2000 | Murray et al. |
| 6,058,293 A | * | 5/2000 | Phillips ................... 455/575.1 |
| 6,490,438 B1 | * | 12/2002 | Wu ........................... 455/90.1 |

FOREIGN PATENT DOCUMENTS

| | | |
|---|---|---|
| EP | 0 772 333 A2 | 5/1997 |
| EP | 1 148 693 A2 | 10/2001 |
| JP | 8-236951 | 9/1996 |
| JP | 11-87940 | 3/1999 |

* cited by examiner

Primary Examiner—Fan Tsang
Assistant Examiner—Md. S Elahee
(74) Attorney, Agent, or Firm—Pearne & Gordon LLP

(57) ABSTRACT

A folding portable cellular phone includes a first box member and a second box member. The first box member includes: an upper case having a window for a display unit; an upper substrate on which electric parts are mounted; an upper hinge frame; and an upper cover on which these components are mounted. The second box member includes: a lower cover in which key holes are formed to provide a key console unit; a lower substrate including a PCB (Printed Circuit Board) on which electric parts are mounted; a lower hinge frame; and a lower case on which these components are mounted.

16 Claims, 10 Drawing Sheets

FOLDING PORTABLE CELLULAR PHONE

BACKGROUND OF THE INVENTION

1. Field of the Invention

The present invention relates to a folding portable cellular phone, and relates in particular to a folding portable cellular phone wherein, in order not to expose metal externally, an external part is formed of a material (e.g., a resin) other than metal, and metal parts that are stronger than the external part are used as a skeleton portion of a folded structure, so that productivity is improved.

Further, the present invention relates in particular to a folding portable cellular phone wherein, in order to improve productivity, a reinforcing part (e.g., made of metal) that is stronger than an outer part (e.g., made of resin) is used only at a skeleton portion of a folded structure, while no metal is exposed on the exterior.

2. Description of the Related Art

A feature of the conventional portable cellular phones disclosed in JP-A-8-236951 and JP-A-11-87940 is the use of a light but strong metal, such as magnesium, to form the outer exposed portion of a box shaped member.

However, when metal parts are employed for the exterior of such an object, the manufacturing process part yield is low, since the metal parts are not appropriate for mass production. Further, because of the low yield, the manufacturing costs are increased.

In addition, a special part is required for shielding electric parts that are mounted on a substrate, such as a PCB (Printing Circuit Board), especially when shielding is required in the vicinity of a high frequency circuit that controls signal transmission and reception.

As another aspect, generally, multiple procedures, such as rust prevention, conversion treatment and visual painting, must be performed in order to use light, strong parts made of a metal, such as magnesium, for the external appearance of the box member. Since the defects, such as sink marks (pitting), crinkling (a corrugated defect), an uneven underlayer and an uneven color, are not found until visible painting and rust prevention have been completed, manufacturing yield is low. Further, since the metal part is employed to provide the external appearance of the box member, manufacturing costs are increased.

SUMMARY OF THE INVENTION

To resolve this problem, a first object of the present invention is to provide a folding portable cellular phone wherein, in order not to expose metal externally, an external part is formed of a material (e.g., a resin) other than metal, and metal parts that are stronger than the external part are used as the skeleton portion of a folded structure, so that productivity is improved.

Further, a second object of the present invention is to provide a folding portable cellular phone for which, in order to improve productivity, a reinforcing part that is stronger than an external part is employed only for a skeleton portion of the folded structure, without any metal being externally exposed.

According to a first aspect of the invention, a folding portable cellular phone, a first box member including a receiver and a second box member including a transmitter are rotated relative to each other at a hinge to permit the folding of said portable-cellular phone. Parts other than those composed of metal are employed as external parts for said first box member and said second box member. Chassis made of a metal part and including integrally formed hinges constitute skeletons of said first box member and said second box member.

With this structure, since the chassis in which the hinges are integrally formed are composed of metal parts, a high yield will be obtained during the manufacture of the external parts.

According to a second aspect of the invention, in the folding portable cellular phone of the first aspect, the metal part is made of either magnesium or an aluminum alloy.

With this arrangement, since a light, easily machined metal is employed for parts other than the external parts, manufacturing the external parts will be easy, and a high yield will be obtained.

According to a third aspect of the invention, in the folding portable cellular phone of the first aspect, the chassis supports a substrate on which electric parts are mounted.

With this arrangement, the substrates can be supported by the chassis for which the hinges are integrally formed.

According to a fourth aspect of the invention, in the folding portable cellular phone of the first aspect, the chassis functions as an electromagnetic absorption member and absorbs an unwanted electromagnetic wave.

With this arrangement, since the chassis provides an electromagnetic wave absorption function, an independent shielding part is not required.

According to a fifth aspect of the invention, in the folding portable cellular phone of one of the first to fourth aspects, the chassis is used as an antenna ground plate, and a hole formed in the antenna ground plate is used to mount the antenna on a substrate.

With this arrangement, an incorporated antenna can be easily provided.

According to a sixth aspect of the invention, in the folding portable cellular phone of the first aspect, a unit connector is provided between portions of the hinges, which are integrally formed with the chassis, to electrically connect the first box member and the second box member.

With this arrangement, a satisfactory space can be obtained in which the unit connector can be provided.

According to a seventh aspect of the invention, in the folding portable cellular phone of the sixth aspect, the unit connector is constituted by a flexible substrate and a coaxial cable.

With this arrangement, the flexible substrate and the coaxial cable can be freely inserted.

According to an eighth aspect of the invention, in the folding portable cellular phone of the first aspect, in order to cover the hinges, hinge covers, which are composed of the same material as the external parts, are provided for the first box member and the second box member.

With this arrangement, since the shaft of the hinge is not externally exposed, no limitations are placed on the design of the portable cellular phone, and accordingly, various models can be easily developed.

According to a ninth aspect of the present invention, a first box member including a receiver and a second box member including a transmitter are rotated relative to each other at hinges to permit the folding of said portable cellular phone. One or both of said hinges of said first box member and said second box member are made of reinforcing parts that are stronger than external parts and that reinforce said external parts.

According to this arrangement, since a reinforcing part, which is stronger than and reinforces the external parts is used for one or both of the hinges, the external parts can be produced at a high yield.

According to a tenth aspect of the invention, in the folding portable cellular phone of the ninth aspect, said external parts are at least one of an upper cover of said first box member and a lower cover of said second box member. The reinforcing parts are an upper hinge frame and a lower hinge frame, both including hinge portions provided respectively for said first and second box members.

According to this arrangement, since the reinforcing parts are used only for the hinge frames, the external parts are produced at a high yield.

According to an eleventh aspect of the invention, in the folding portable cellular phone of the tenth aspect, the upper hinge frame and said lower hinge frame are inserted into said external parts.

With this arrangement, the hinge frames can easily be formed for the external parts by insert molding.

According to a twelfth aspect of the invention, in the folding portable cellular phone of the tenth aspect, said upper hinge frame and said lower hinge frame are integrally formed with a chassis that supports a substrate.

With this arrangement, the hinge frame and the chassis can be integrally formed.

According to a thirteenth aspect of the invention, in the folding portable cellular phone of the twelfth aspect, said chassis functions as an electromagnetic wave absorption member for absorbing an unwanted electromagnetic wave.

With this arrangement, the hinge frame and the chassis are integrally formed and the electromagnetic wave absorption function can be provided for the chassis.

According to a fourteenth aspect of the invention, in the folding portable cellular phone of the twelfth aspect, a rib is formed on said chassis in order to prevent is the leakage of light at a portion in which said external parts engage.

With this arrangement, when the portable cellular phone is folded, the leakage of light can be prevented at the gap between the case covers, i.e., the portion whereat the external parts engage.

According to a fifteenth aspect of the invention, in the folding portable cellular phone of the twelfth aspect, a rib is formed around said chassis to reinforce said external parts that constitute said box members.

With this arrangement, the strength of the external parts, such as a case and a cover, can be increased.

According to a sixteenth aspect of the invention, in the folding portable cellular phone of one of the twelfth to fifteenth aspects, either said upper hinge frame or said lower hinge frame is fixed to said external parts by means such as screws or pawls.

With this arrangement, the hinge frames can be fixed directly to the external parts.

According to a seventeenth aspect of the invention, in the folding portable cellular phone of the tenth aspect either said upper hinge frame or said lower hinge frame is an independent part and is securely attached to said chassis that support said substrates, and a chassis is fixed to said external parts by means such as screws or pawls.

With this arrangement, the external parts can be fixed via the chassis to which the hinge frames are securely attached.

According to an eighteenth aspect of the invention, in the folding portable cellular phone of one of the tenth to seventeenth aspects, only one hinged portion is formed for said upper hinge frame and for said lower hinge frame.

With this arrangement, since only one hinge is provided, another part, such as a camera, can be mounted at a location corresponding to that whereat the other hinge would be installed.

DETAILED DESCRIPTION OF THE PREFERRED EMBODIMENTS

Figure 1:
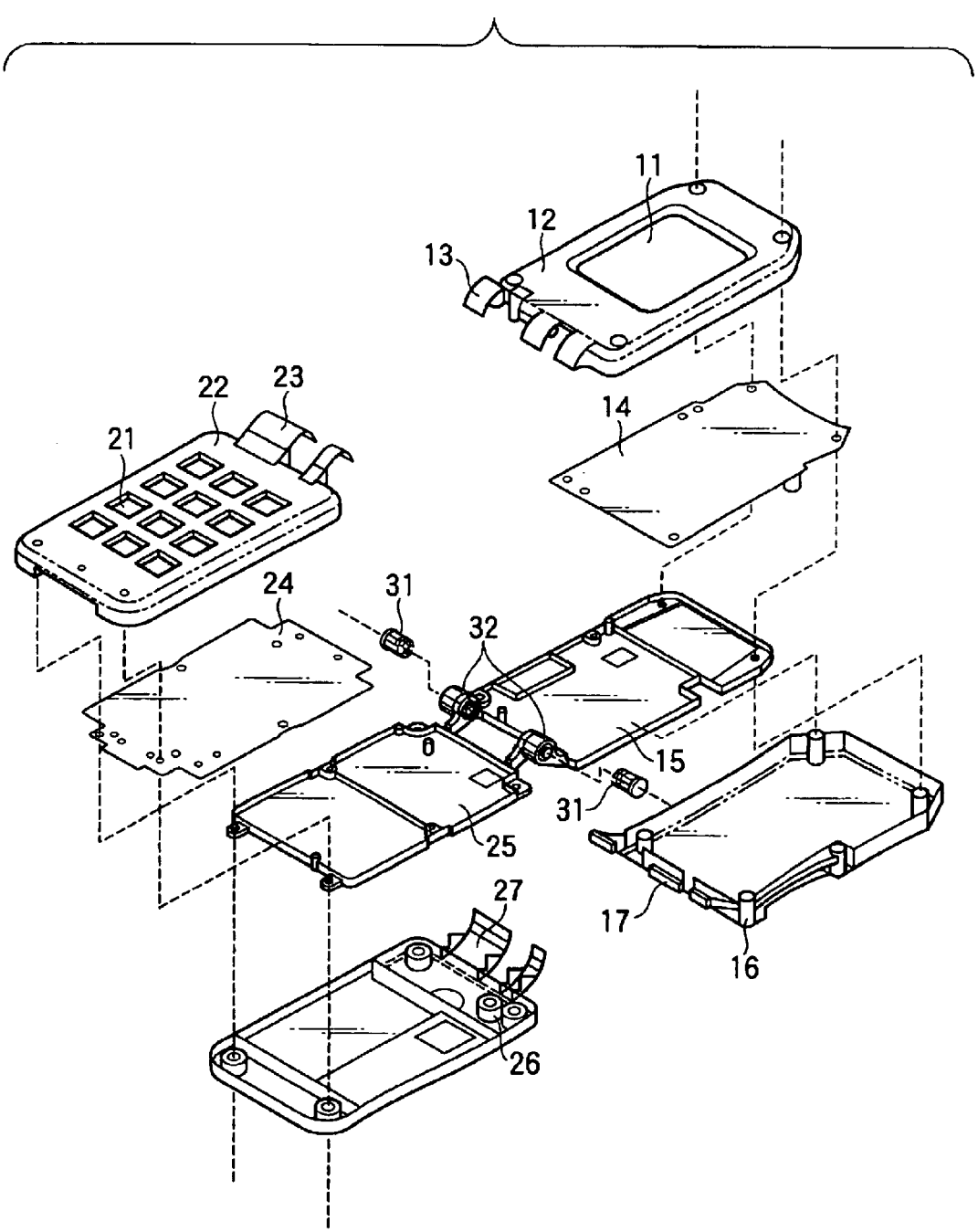
FIG. 1 is an exploded perspective view of the structure of a folding portable cellular phone according to an embodiment of the present invention.

Preferred embodiments of the present invention will now be described while referring to the drawings.

FIG. 1 is an exploded perspective view of the configuration of a folding portable cellular phone according to the embodiment. In FIG. 1, the folding portable cellular phone comprises external parts, such as a cover and a case, and an upper substrate on which electric parts are mounted, and first and second box members for which portions of a hinge are provided.

In this embodiment, the side including a receiver and a display unit (neither of which is shown) is defined as the first box member, and the side including a transmitter and a key console unit (neither of which is shown) is defined as the second box member.

The first and the second box members is coupled by the hinge, and the hinge, by permitting the two members to pivot with each other, enable the folding of the portable cellular phone at the hinge.

In FIG. 1, the first box member includes: an upper case 12, which has a window 11 for the display unit (not shown) and includes a hinge cover 13; an upper substrate 14, which is a PCB (Printing Circuit Board) on which electric parts (not shown) are mounted; an upper chassis 15, which constitutes a part of a skeleton and with which hinged portions 32 are integrally formed; and an upper cover 16, on which these components are mounted and which includes a hinge cover 17. The upper case 12 constitutes the external portion that, as a part of a portable cellular phone, attracts user attention. As for the skeleton, the upper chassis 15, with which the hinge portions 32 are integrally formed, is fixed to the upper case 12 by means such as screws or pawls.

Further, in FIG. 1, the second box member includes: a lower cover 22, which has a hinge cover 23 in which key holes 21 are formed to provide a key console unit (not shown); a lower substrate 24, which is a PCB (Printing Circuit Board) on which electric parts (not shown) are mounted; a lower chassis 25, which constitutes a part of the skeleton and which is integrally formed with hinged portions 32; and a lower case 26, which has a hinge cover 27 and on which these components are mounted. The lower case 22 is the external portion that, as a part of a portable cellular phone, attracts user attention. As for the skeleton, the lower chassis 25, with which the hinged portions 32 are integrally formed, is secured to the lower cover 22 by means such as screws or pawls.

In FIG. 1, hinges 31 are provided as parts associated with the right and left hinged portions 32. Further, a space is defined between the hinged portions 32 in order to permit the insertion of unit connectors (not shown) that electrically connect the upper substrate 14 and the lower substrate 24. The unit connectors are a flexible substrate and a coaxial cable.

Figure 2:
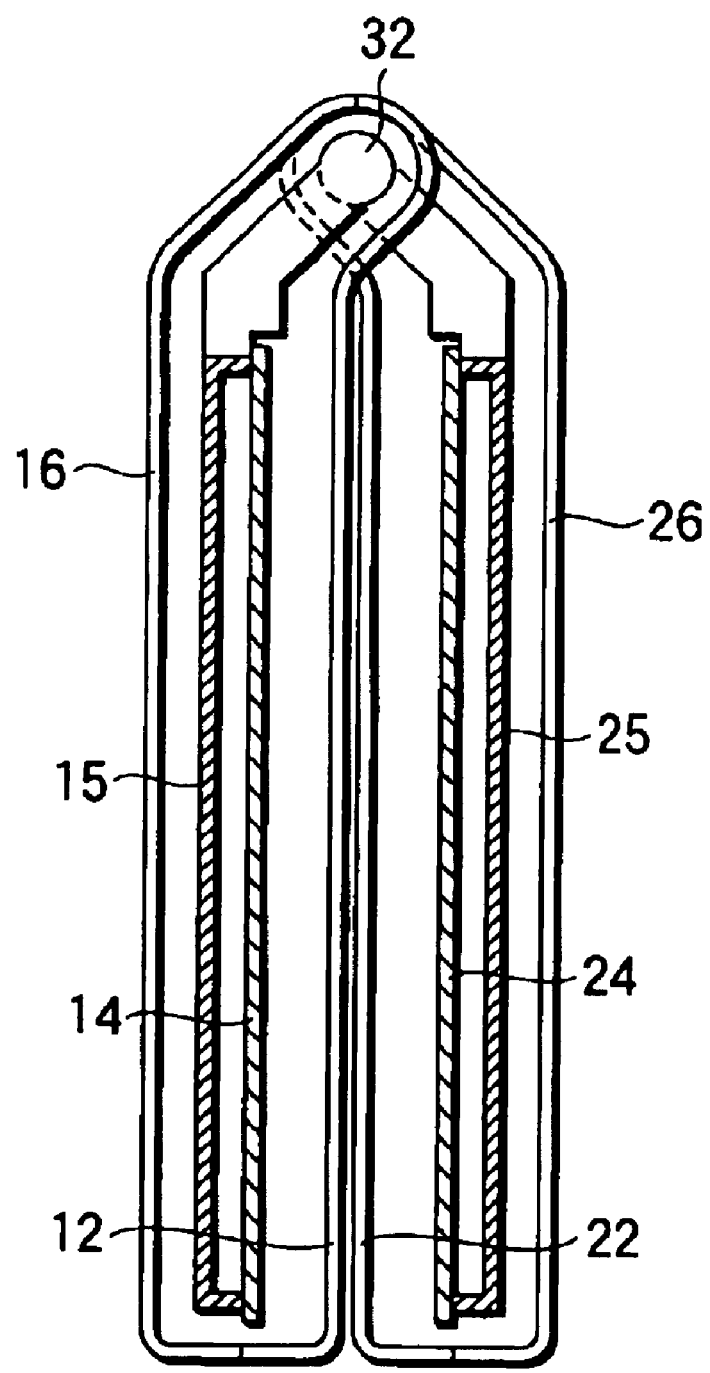
FIG. 2 is a cross-sectional view of the folding portable cellular phone in FIG. 1 when it is closed.
Figure 3:
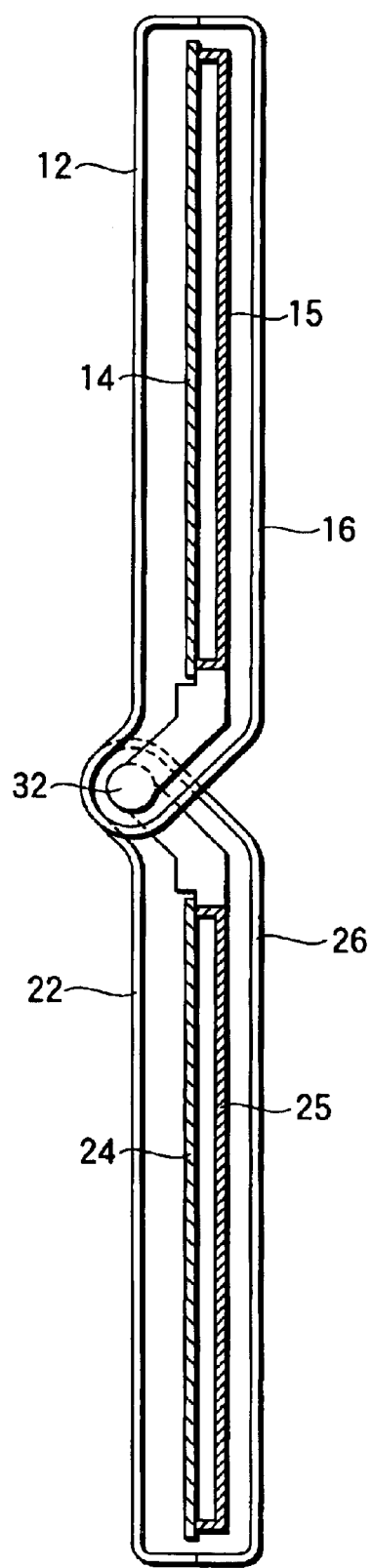
FIG. 3 is a cross-sectional view of the folding portable cellular phone in FIG. 1 when it is open.

FIG. 2 is a cross-sectional view of the folding portable cellular phone in FIG. 1 when it is closed, and FIG. 3 is a cross-sectional view of the folding portable cellular phone in FIG. 1 when it is open. As is apparent from FIGS. 2 and 3, the upper chassis 15 and the hinged portions 32 are integrally formed, as are the lower chassis 25 and the hinged portions 32, and a substrate is mounted on each chassis.

Figure 4A:
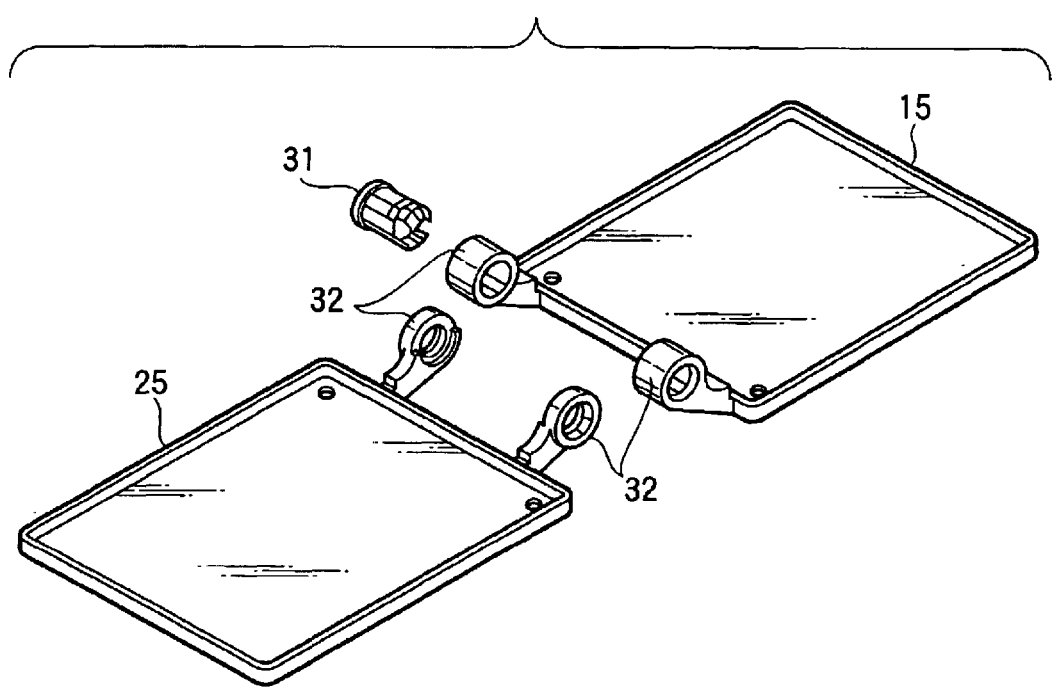
FIG. 4(a) is a diagram showing the structure of an upper chassis and a lower chassis when hinges are removed therefrom.
Figure 4B:
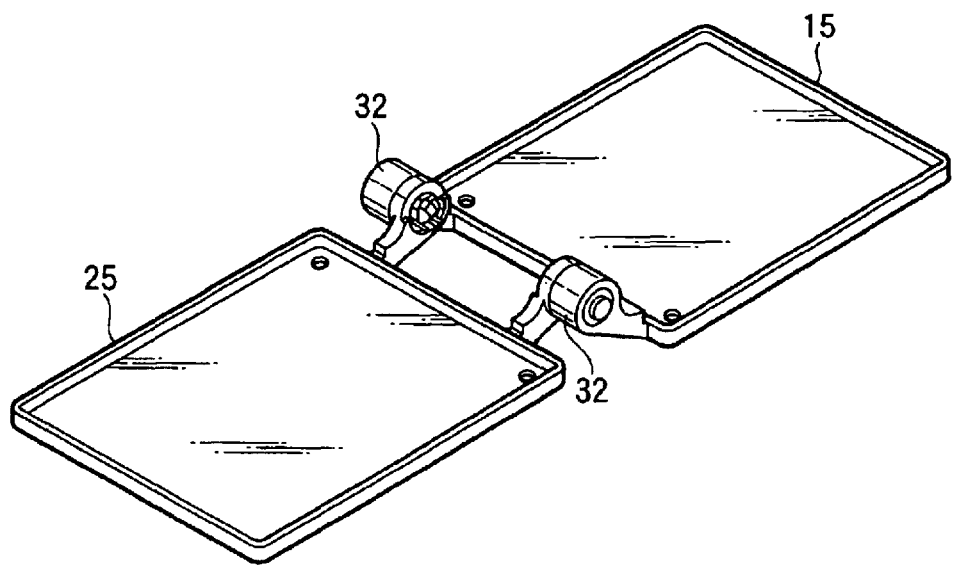
FIG. 4(b) is a diagram showing the structure of the upper chassis and the lower chassis when the hinges are attached thereto.

FIGS. 4(a) and 4(b) are diagrams showing the structures of the chassis, which are integrally formed with hinge portions 32, as the skeletons of the first and the second box members. In FIG. 4(a), the structure of the upper chassis 15 and the lower chassis 25 is shown with the hinges 31 removed. In FIG. 4(b), the structure of the upper chassis 15 and the lower chassis 25 is shown with the hinges 31 attached.

Figure 5:
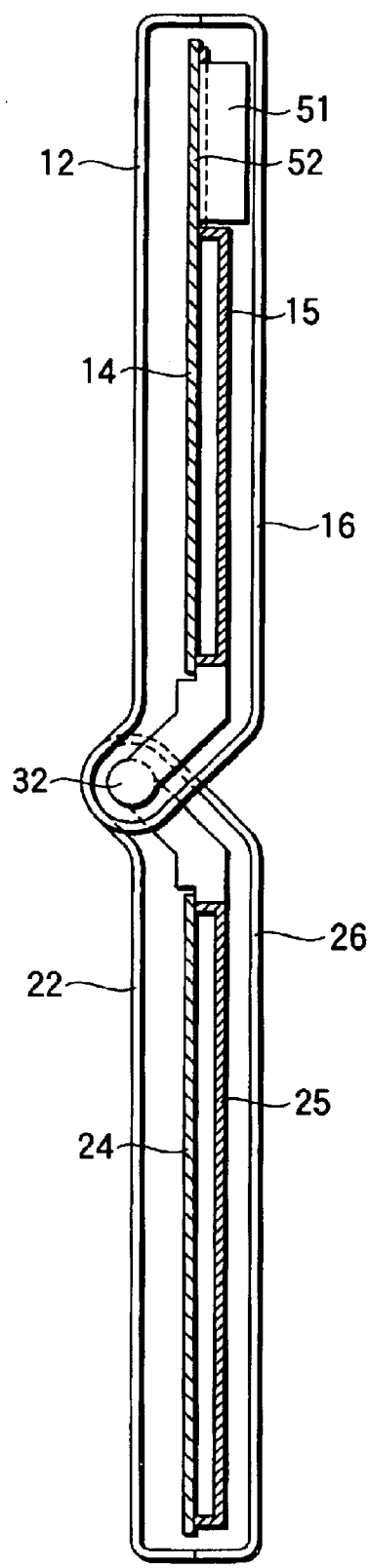
FIG. 5 is a diagram showing the state wherein an antenna is incorporated in the structure in FIG. 1.

FIG. 5 is a diagram showing the state wherein an antenna is incorporated in the structure shown in FIG. 1. In FIG. 5, a hole is formed in a part of the upper chassis 15, and an antenna 51 is attached to the upper substrate 14 via an antenna ground plate 52.

In a conventional structure, since the upper cover is made of metal, and since the metal portion is located on the antenna plate side when antenna components are incorporated inside the box member, the antenna characteristics are adversely affected. However, according to the invention, since the chassis is employed to provide strength for the hinged portion, the upper cover need not be used to provide the strength for the hinged portion. Thus, the upper cover can be made of a non-metallic material (e.g., a resin), so that a portable cellular phone can be provided which exhibits superior antenna characteristics.

Figure 6:
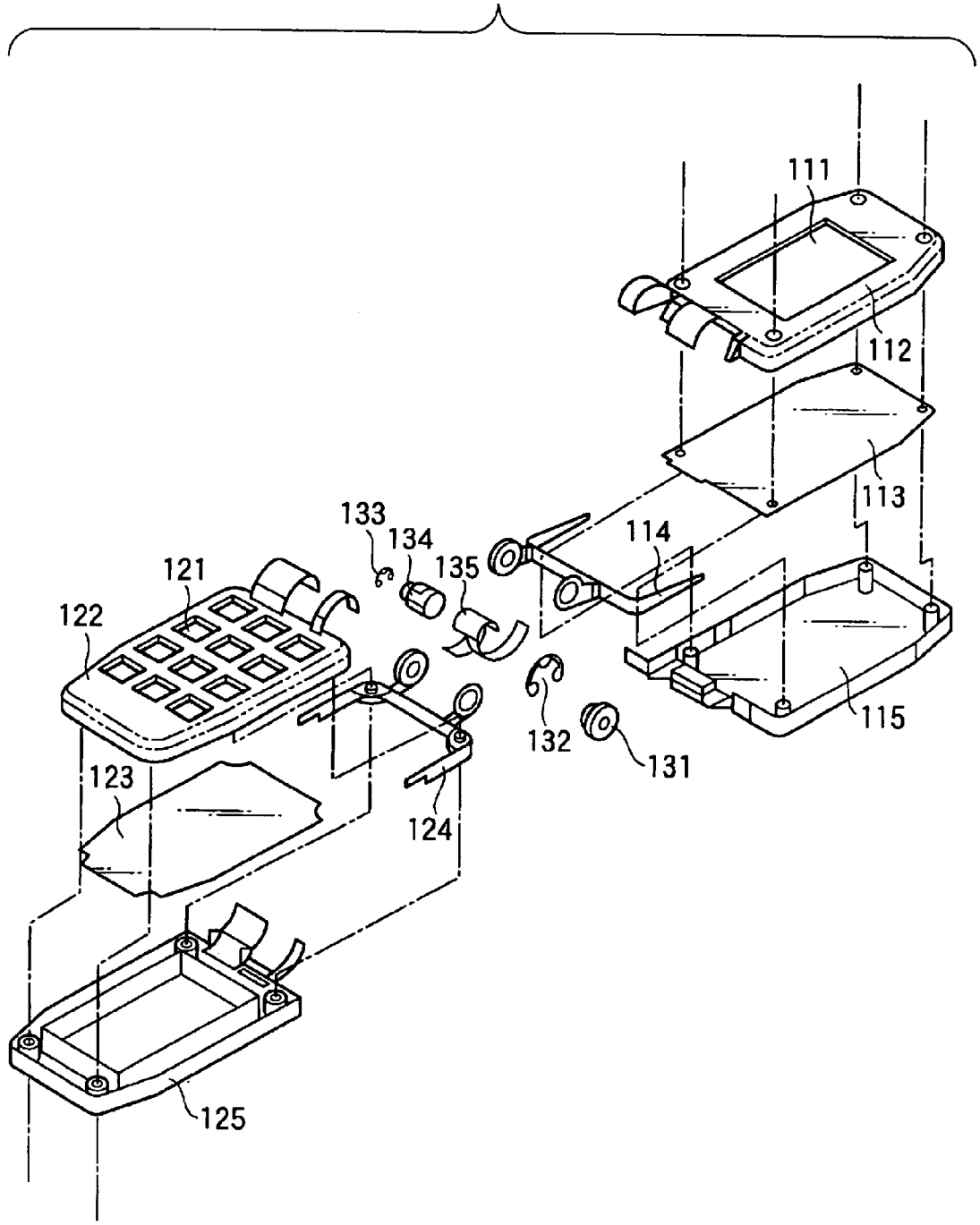
FIG. 6 is an exploded perspective view of the structure of a folding portable cellular phone according to an embodiment of the present invention.

FIG. 6 is an exploded perspective view of the configuration of a folding portable cellular phone according to another embodiment of the invention. In FIG. 6, the folding portable cellular phone comprises external parts, such as a cover and a case, an upper substrate on which electric parts are mounted, and first and second box members provided with a hinge.

In this embodiment, the side wherein there are a receiver and a display unit (neither of them shown) is defined as the first box member, and the side wherein there are a transmitter and a key console unit (neither of them shown) is defined as the second box member.

The first and the second box members are coupled together by the hinge, and pivot relative to each other at the hinge to fold the portable cellular phone.

In FIG. 6, the first box member includes: an upper case 112, having a window 111 for the display unit (not shown); an upper substrate 113, which is a PCB (Printing Circuit Board) on which electric parts (not shown) are mounted; an upper hinge frame 114; and an upper cover 115, on which these components are mounted. The upper case 112 is the external part that, as a part of a portable cellular phone, attracts user attention. Although not shown, the upper hinge frame 114 may be formed by inserting it into the upper case 112, or may be fixed to the upper cover 115 by means such as screws or pawls.

Further, in FIG. 6, the second box member includes: a lower cover 122, in which key holes 121 are formed to provide a key console unit (not shown); a lower substrate 123, which is a PCB (Printing Circuit Board) on which electric parts (not shown) are mounted; a lower hinge frame 124; and a lower case 125, on which these components are mounted. The lower cover 122 is the external part that, as a part of the portable cellular phone, attracts user attention. Although not shown, the lower hinge frame 124 may be formed by inserting it into the lower cover 122, or may be fixed to the lower case 125 by means such as screws or pawls.

In FIG. 6, a shaft 131, E-shaped snap rings 132 and 133, and a hinge 134 are provided as hinge associated components in order to couple the upper hinge frame 114 and the lower hinge frame 124. In addition, a flexible substrate 135 is provided to electrically connect the upper substrate 113 and the lower substrate 123.

Figure 7:
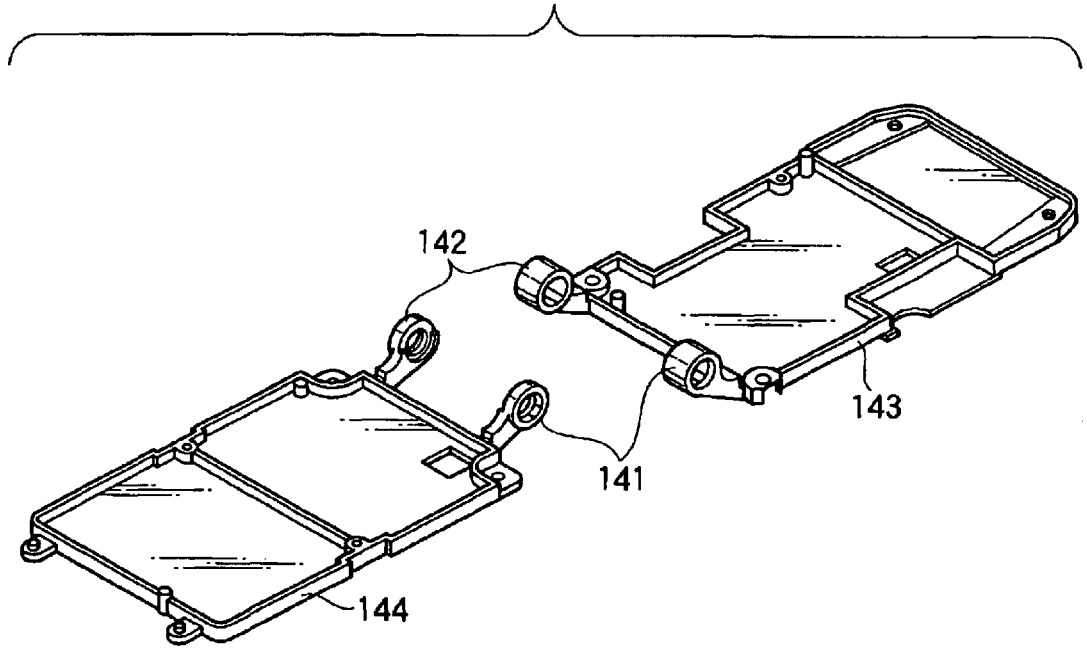
FIG. 7 is a diagram showing a structure example wherein hinge frames are integrally formed with chassis that support substrates.

FIG. 7 is a diagram showing an example, unlike the one shown in FIG. 6, wherein the hinge frames in FIG. 6 are integrally formed with the chassis that support the substrates. Specifically, in FIG. 7, a hinge 142 is integrally formed with an upper chassis 143, and a hinge 142 is integrally formed with a lower chassis 144. The upper chassis 143 is inserted between the upper case 112 and the upper substrate 113 in FIG. 6, and the lower chassis 144 is inserted between the lower cover 122 and the lower substrate 123 in FIG. 6. With this arrangement, the strength of the external parts can be even more increased. Furthermore, the upper and the lower chassis 143 and 144 function as electromagnetic wave absorption members (shields) for absorbing unwanted electromagnetic waves.

Figure 8:
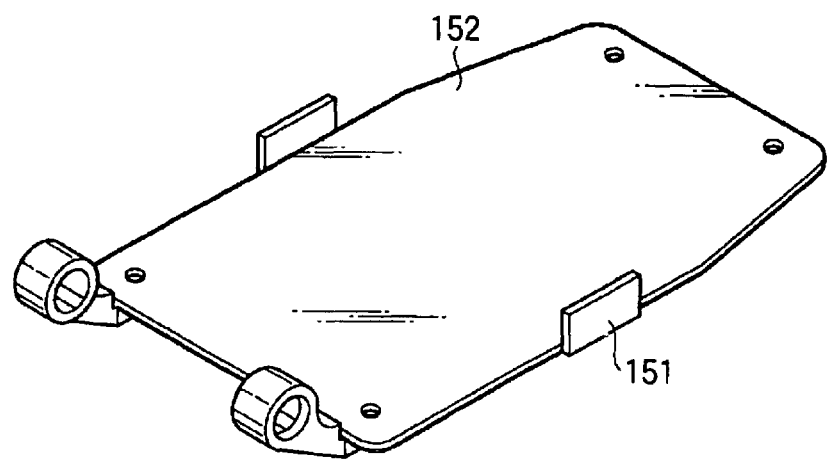
FIG. 8 is a diagram showing an example where light leak prevention ribs are formed for the structure that the hinge frames in FIG. 7 are integrally formed with the chassis that support the substrate.

FIG. 8 is a diagram showing an example wherein light leak prevention ribs 151 are formed on the structure where, as in FIG. 7, the hinge frame is integrally formed with the chassis that supports the substrate. Since light leakage tends to occur at the gap between the case covers when the portable cellular phone is folded, the ribs 151 need only be formed at a tongue-and-groove gap, so that at the portion whereat the exterior parts are engaged the leakage of light can be prevented.

Figure 9A:
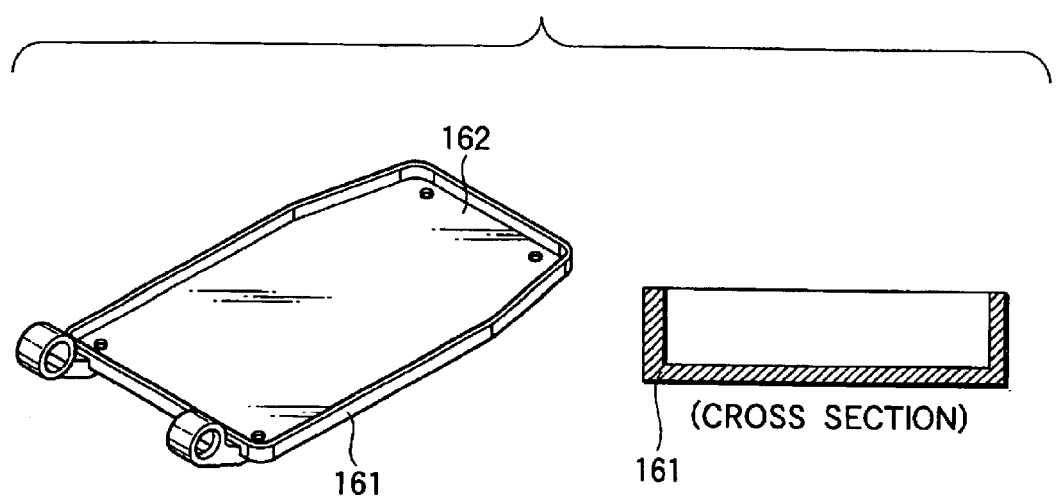
FIG. 9(a) is a diagram showing the structure when a first reinforcing rib, which has a C shape, is formed around a chassis to reinforce exterior parts that constitute a box member.
Figure 9B:
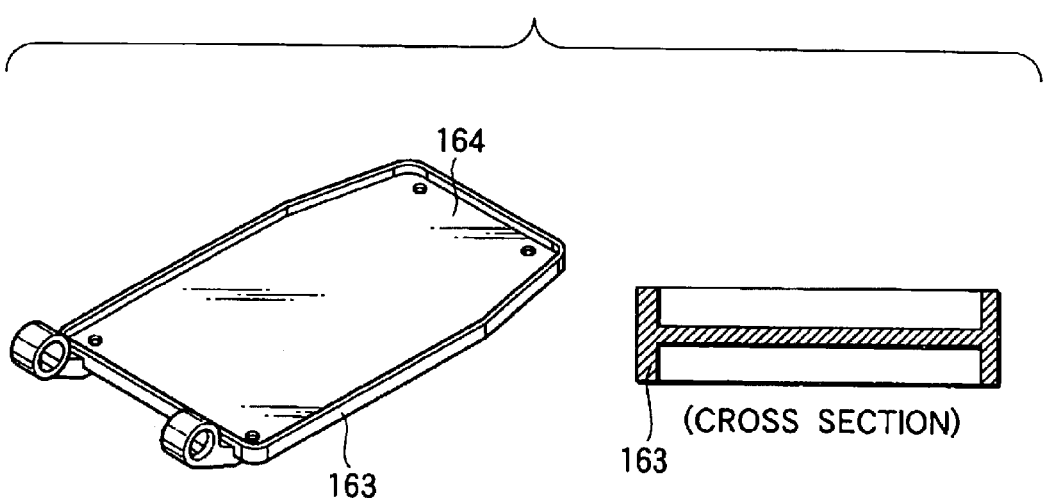
FIG. 9(b) is a diagram showing the structure when a second reinforcing rib, which has an H shape, is formed around a chassis to reinforce external parts that constitute a box member.

FIGS. 9(a) and 9(b) are diagrams showing the structures when ribs are formed around two chassis to reinforce the external parts that constitute each box member. In FIG. 9(a), a first reinforcing rib 161, which has a C shape, is formed around a chassis 162, and in FIG. 9(b), a second reinforcing rib 163, which has an H shape, is formed around a chassis 164. With this arrangement, the strength of external parts, such as a case or a cover, can be increased.

Figure 10A:
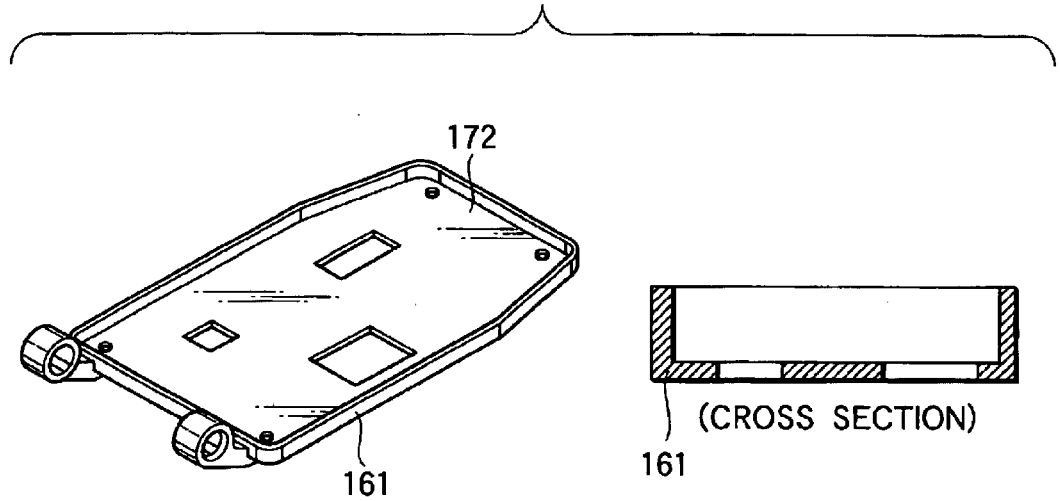
FIG. 10(a) is a diagram showing the structure when a reinforcing rib, which has a C shape, is formed around a chassis and holes are formed in the chassis.
Figure 10B:
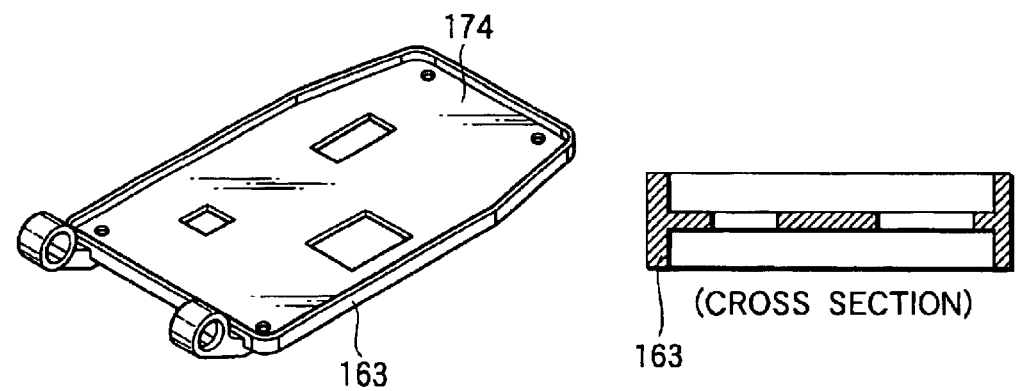
FIG. 10(b) is a diagram showing the structure when a second reinforcing rib, which has an H shape, is formed around a chassis and holes are formed in the chassis.

FIGS. 10(a) and 10(b) are diagrams showing the structures, as in FIGS. 9(a) and 9(b), whereon ribs are formed around two chassis to reinforce the external parts that constitute box members and holes are formed in the chassis. In FIG. 10(a), holes are formed in a chassis 172 around which the first reinforcing rib 161, which has a C shape, is formed, and in FIG. 10(b), holes are formed in a chassis 174 around which the second reinforcing rib 163 which has an H shape, is formed. The holes are formed in the chassis to reduce the weight of the box members and to obtain the necessary heights for the parts.

Figure 11:
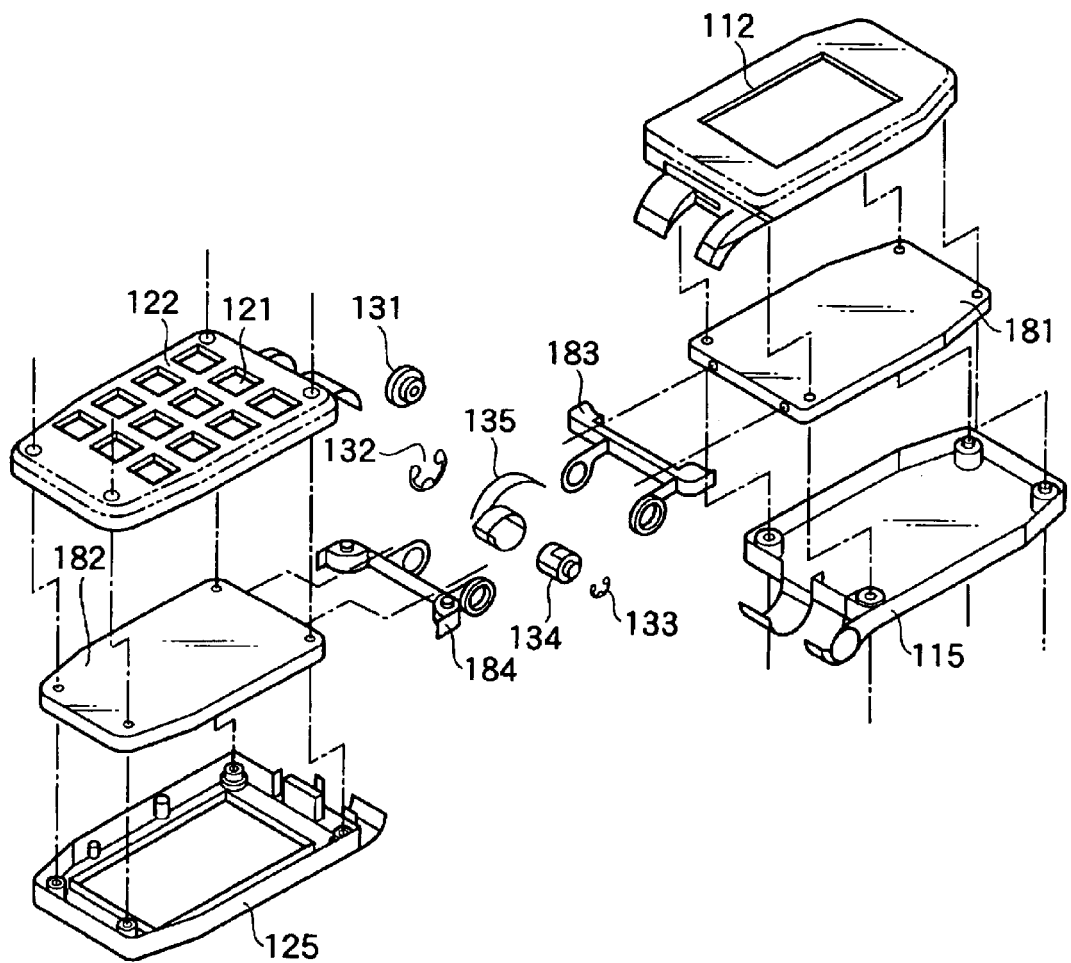
FIG. 11 is an exploded perspective view of a structure for the folding portable cellular phone of the invention that differs from the one in FIG. 6.

FIG. 11 is an exploded perspective view of another structure for the folding portable cellular phone according to an embodiment of the present invention. The differences between this structure and the one in FIG. 6 are that a substrate is accommodated in the chassis, and that an independent hinge is securely fixed to the chassis by a screw. The other portions of the structure are the same as those in FIG. 6. It should be noted, however, that the shaft and the hinge are attached in a different direction than is the hinge in FIG. 6.

In this embodiment, multiple hinged portions are provided for the upper hinge frame and the lower hinge frame. However, only one hinged portion may be provided for the upper hinge frame and the lower hinge frame.

With this structure, since there is only one hinged portion, another part, such as a camera, can be mounted at a location corresponding to that whereat the other hinged portion would be installed.

What is claimed is:

1. A folding portable cellular phone comprising:
    a first box member including a receiver,
    a second box member including a transmitter,
    a hinge for folding said portable cellular phone, wherein said first box member and said second box member are rotated relative to each other at said hinge for folding said portable cellular phone, and
    a chassis constituting an internal skeleton portion of said first box member and said second box member, said chassis being made of a metal part and including integrally formed hinge portions of said hinge.
    wherein parts other than those made of metal are employed as external parts for said first box member and said second box member.

2. The folding portable cellular phone according to claim 1, wherein said metal part is made of one of magnesium and an aluminum alloy.

3. The folding portable cellular phone according to claim 1, said chassis supports a substrate on which electric parts are mounted.

4. The folding portable cellular phone according to claim 1, wherein said chassis functions as an electromagnetic absorption member and absorbs an unwanted electromagnetic wave.

5. The folding portable cellular phone according to claim 1, wherein said chassis is used as an antenna ground plate, and a hole formed in said antenna ground plate is used to mount an antenna on a substrate.

6. The folding portable cellular phone according to claim 1, wherein a unit connector is provided between portions of said hinge portions of said chassis in order to electrically connect said first box member and said second box member.

7. The folding portable cellular phone according to claim 6, wherein said unit connector includes a flexible substrate and a coaxial cable.

8. The folding portable cellular phone according to claim 1, wherein hinge covers made of the same material as said external parts are provided with said first box member and said second box member in order to cover said hinge portions.

9. A folding portable cellular phone comprising:
    a first box member including a receiver,
    a second box member including a transmitter,
    a hinge for folding said portable cellular phone, wherein said first box member and said second box member are rotated relative to each other at said hinge for folding said portable cellular phone, and
    at least one hinge part of said hinge includes a reinforcing part that is stronger than external parts of said first box member and second box member and said reinforcing part reinforces said external parts,
    wherein said external parts are at least one of an upper cover of said first box member and a lower cover of said second box member, and
    wherein said reinforcing part is an upper hinge frame and a lower hinge frame including at least one hinge portion provided for each of said first member and said second box member.

10. The folding portable cellular phone according to claim 9, wherein said upper hinge frame and said lower hinge frame are inserted into said external parts.

11. The folding portable cellular phone according to claim 9, wherein said upper hinge frame and said lower hinge frame are integrally formed with an internal chassis that supports a substrate.

12. The folding portable cellular phone according to claim 11, wherein said chassis functions as an electromagnetic wave absorption member for absorbing an unwanted electromagnetic wave.

13. The folding portable cellular phone according to claim 11, wherein a rib is formed on said chassis in order to prevent leakage of light at a portion in which said external parts engage.

14. The folding portable cellular phone according to claim 11, wherein a rib is formed around said chassis to reinforce said external parts constituting said box members.

15. The folding portable cellular phone according to claim 9, wherein one of said upper hinge frame and said lower hinge frame is fixed to said external part with one of a screw and a pawl.

16. The folding portable cellular phone according to claim 9, wherein one of said upper hinge frame and said lower hinge frame is an independent part and is securely attached to an internal chassis that supports a substrate, and said chassis is fixed to said external part with one of a screw and a pawl.

* * * * *